(12) United States Patent
Mulin

(10) Patent No.: US 11,190,652 B2
(45) Date of Patent: Nov. 30, 2021

(54) ELECTRONIC APPARATUS FOR PROVIDING USER INTERFACE OF IMAGE FORMING APPARATUS

(71) Applicant: Hewlett-Packard Development Company, L.P., Spring, TX (US)

(72) Inventor: Aleksei Mulin, Seongnam-si (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/980,903

(22) PCT Filed: Jul. 19, 2018

(86) PCT No.: PCT/KR2018/008154
§ 371 (c)(1),
(2) Date: Sep. 15, 2020

(87) PCT Pub. No.: WO2019/198879
PCT Pub. Date: Oct. 17, 2019

(65) Prior Publication Data
US 2021/0006675 A1    Jan. 7, 2021

(30) Foreign Application Priority Data
Apr. 12, 2018 (KR) ........................ 10-2018-0042963

(51) Int. Cl.
*G06F 3/12* (2006.01)
*H04N 1/00* (2006.01)

(52) U.S. Cl.
CPC ....... *H04N 1/00411* (2013.01); *G06F 3/1253* (2013.01); *H04N 1/00204* (2013.01); *H04N 1/00413* (2013.01)

(58) Field of Classification Search
None
See application file for complete search history.

(56) References Cited

U.S. PATENT DOCUMENTS 9,141,326 B2    9/2015   Nakamura
9,164,711 B2   10/2015   Mori
(Continued)

FOREIGN PATENT DOCUMENTS

| JP | 2013-214806 A | 10/2013 |
| JP | 2014-50015 A | 3/2014 |
| JP | 2015-118470 A | 6/2015 |

*Primary Examiner* — Henok Shiferaw
(74) *Attorney, Agent, or Firm* — Jefferson IP Law, LLP

(57) ABSTRACT

An image forming apparatus and a method of operating an electronic apparatus are provided. The method includes executing an application for controlling an operation of the image forming apparatus, in the electronic apparatus, identifying a first image forming apparatus to be connected to the electronic apparatus and performing communication connection between the electronic apparatus and the first image forming apparatus, receiving an application list including at least one application installed in the first image forming apparatus from the first image forming apparatus and displaying the application list, receiving a first input for selecting a first application of the first image forming apparatus to be controlled by the electronic apparatus, based on the application list, and displaying a screen for setting a certain function supported by the first application, based on at least one input that is input after the first input.

20 Claims, 10 Drawing Sheets

(56) References Cited

U.S. PATENT DOCUMENTS

| | | | |
|---|---|---|---|
| 10,735,616 B2* | 8/2020 | Asai | H04L 67/34 |
| 10,785,380 B2* | 9/2020 | Yasui | G06F 3/1205 |
| 10,866,710 B2* | 12/2020 | Asai | H04N 1/00973 |
| 2009/0144629 A1 | 6/2009 | Ferlitsch et al. | |
| 2013/0141747 A1 | 6/2013 | Oba et al. | |
| 2014/0185088 A1* | 7/2014 | Lee | H04N 1/32106 |
| | | | 358/1.15 |
| 2014/0355048 A1* | 12/2014 | Kang | G06F 3/1229 |
| | | | 358/1.15 |
| 2015/0381843 A1* | 12/2015 | Sakayama | H04N 1/00411 |
| | | | 358/1.15 |
| 2016/0269576 A1* | 9/2016 | Norota | G06F 3/1292 |
| 2017/0083197 A1* | 3/2017 | Lee | G06F 3/04817 |
| 2017/0134596 A1* | 5/2017 | Sato | H04N 1/00411 |
| 2017/0142268 A1* | 5/2017 | Ichiyama | H04N 1/00392 |
| 2017/0192725 A1 | 7/2017 | Choi et al. | |
| 2017/0341444 A1* | 11/2017 | Olores | H04N 1/00 |

* cited by examiner

[Fig. 1]
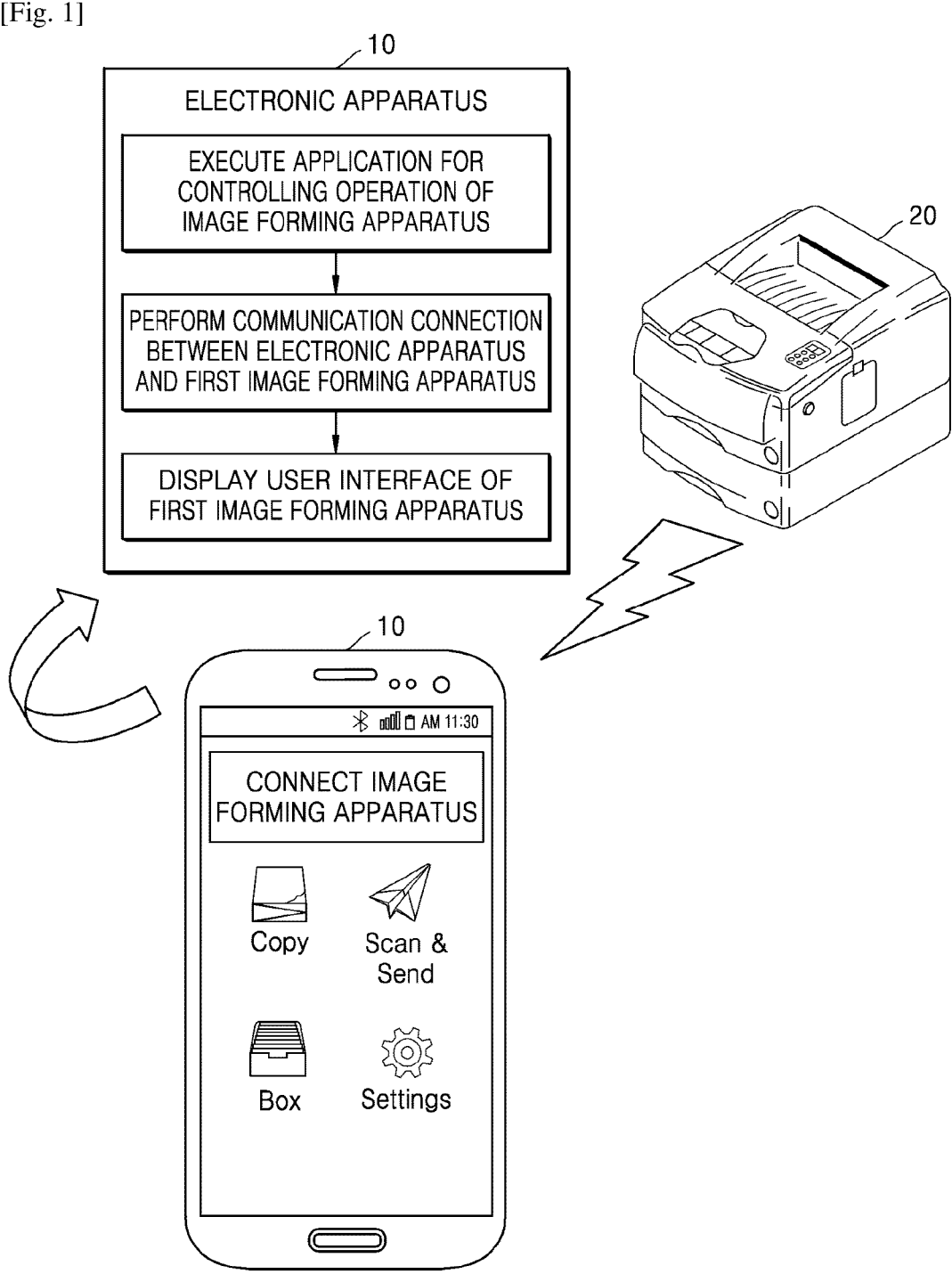

[Fig. 2]
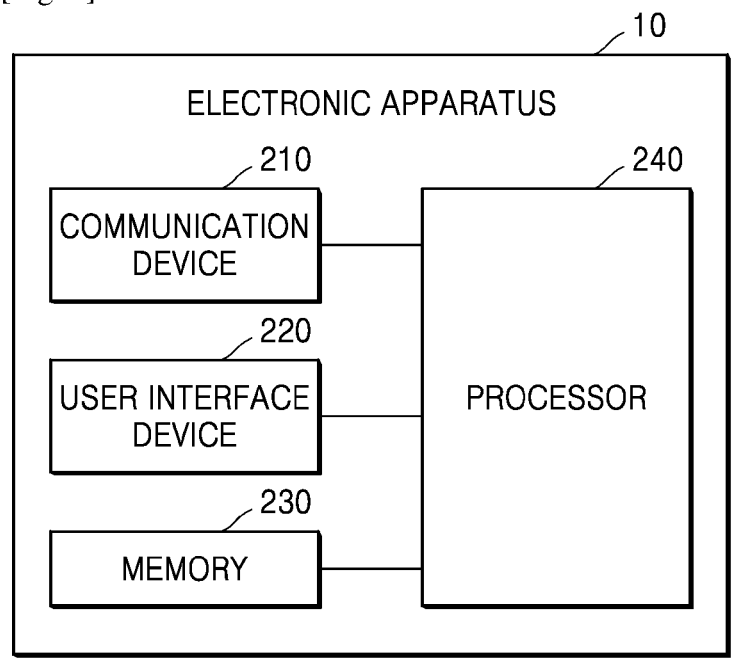
[Fig. 3]
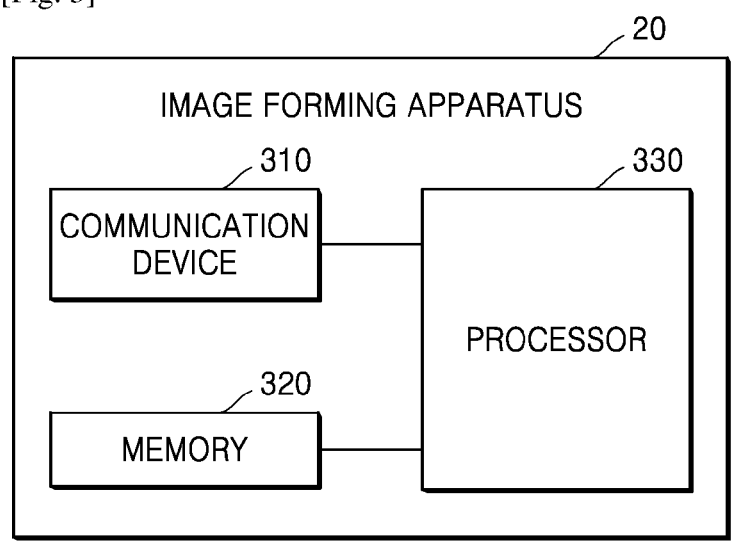

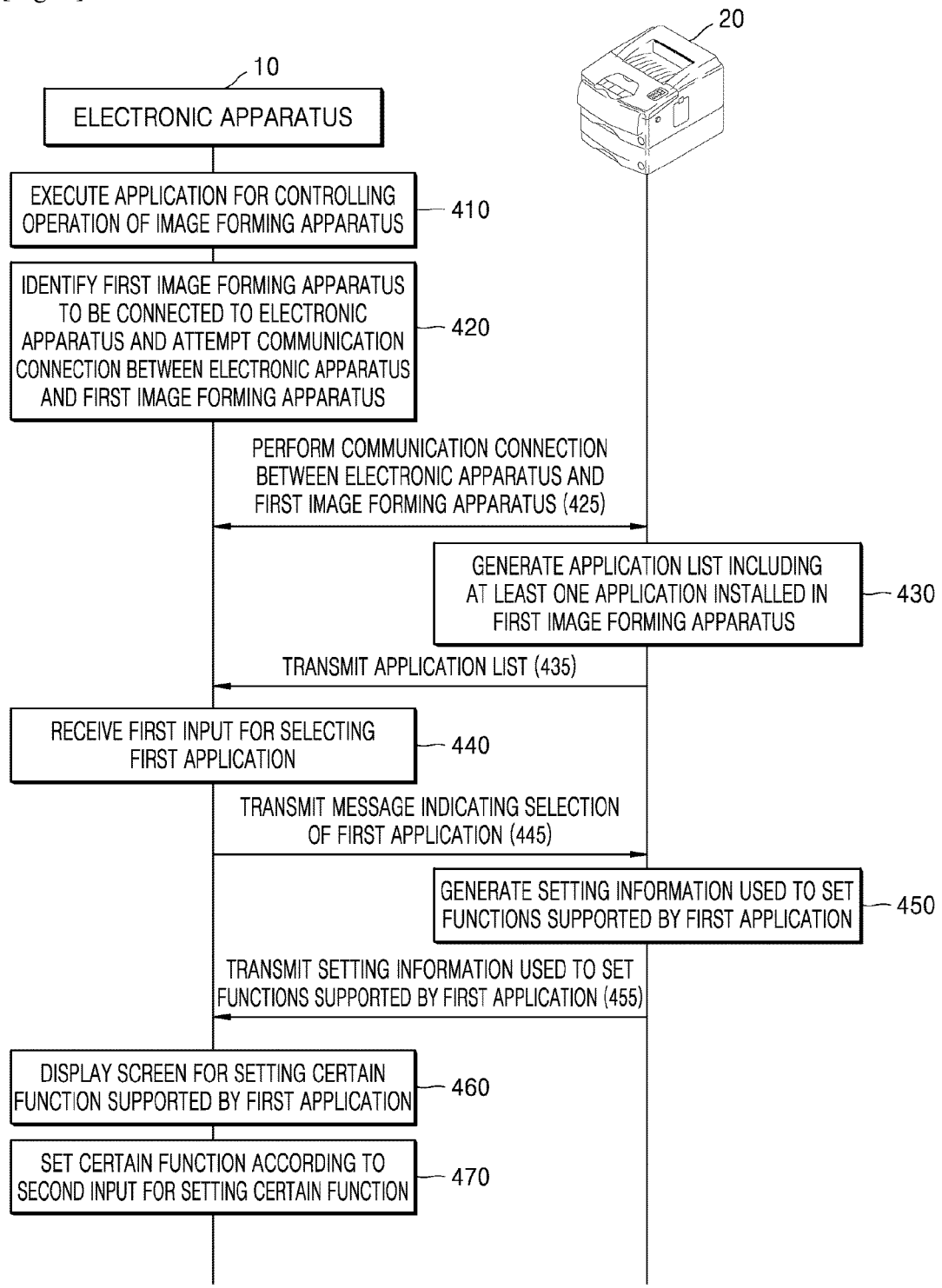
[Fig. 4]

[Fig. 5]
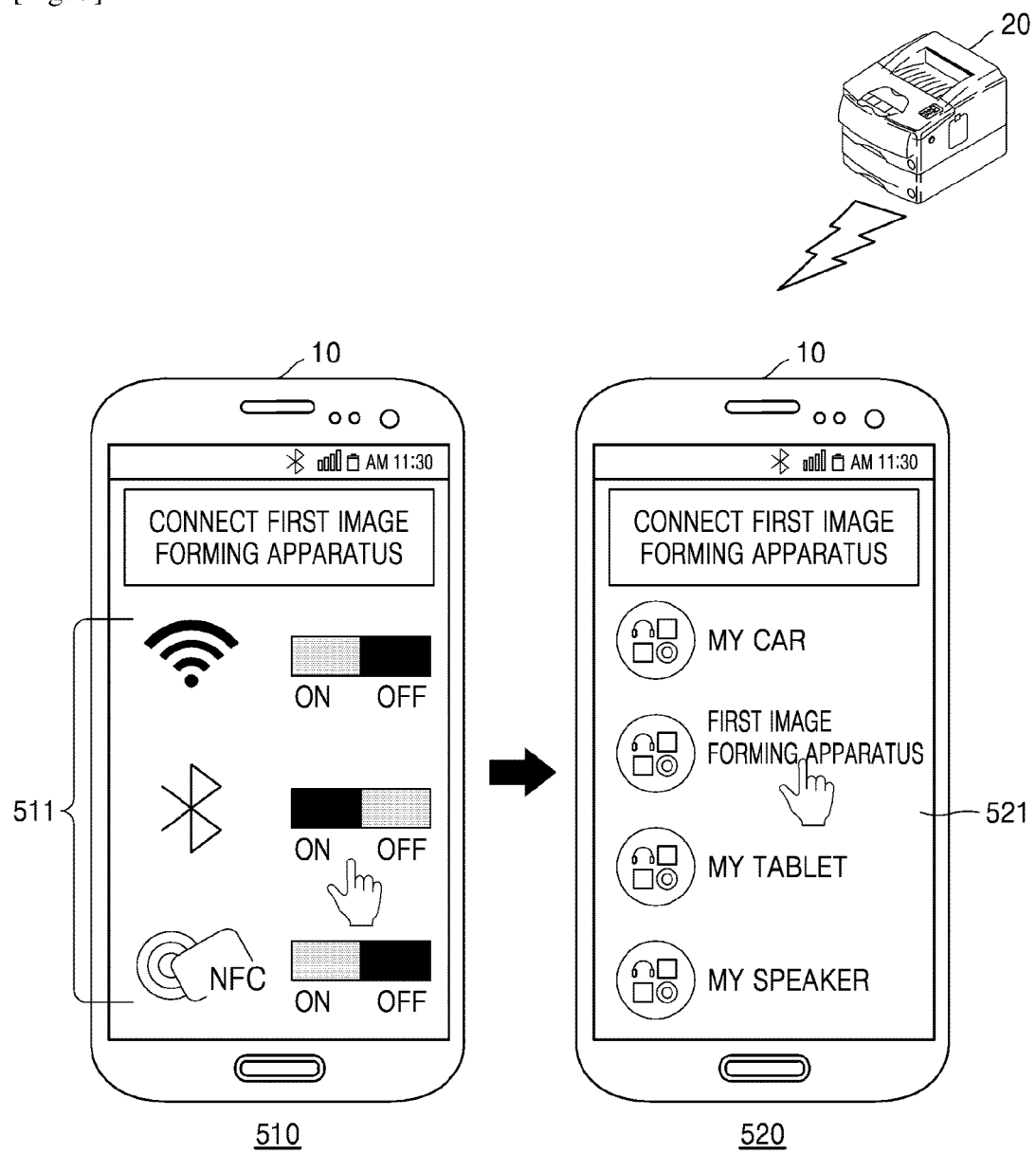

[Fig. 6]
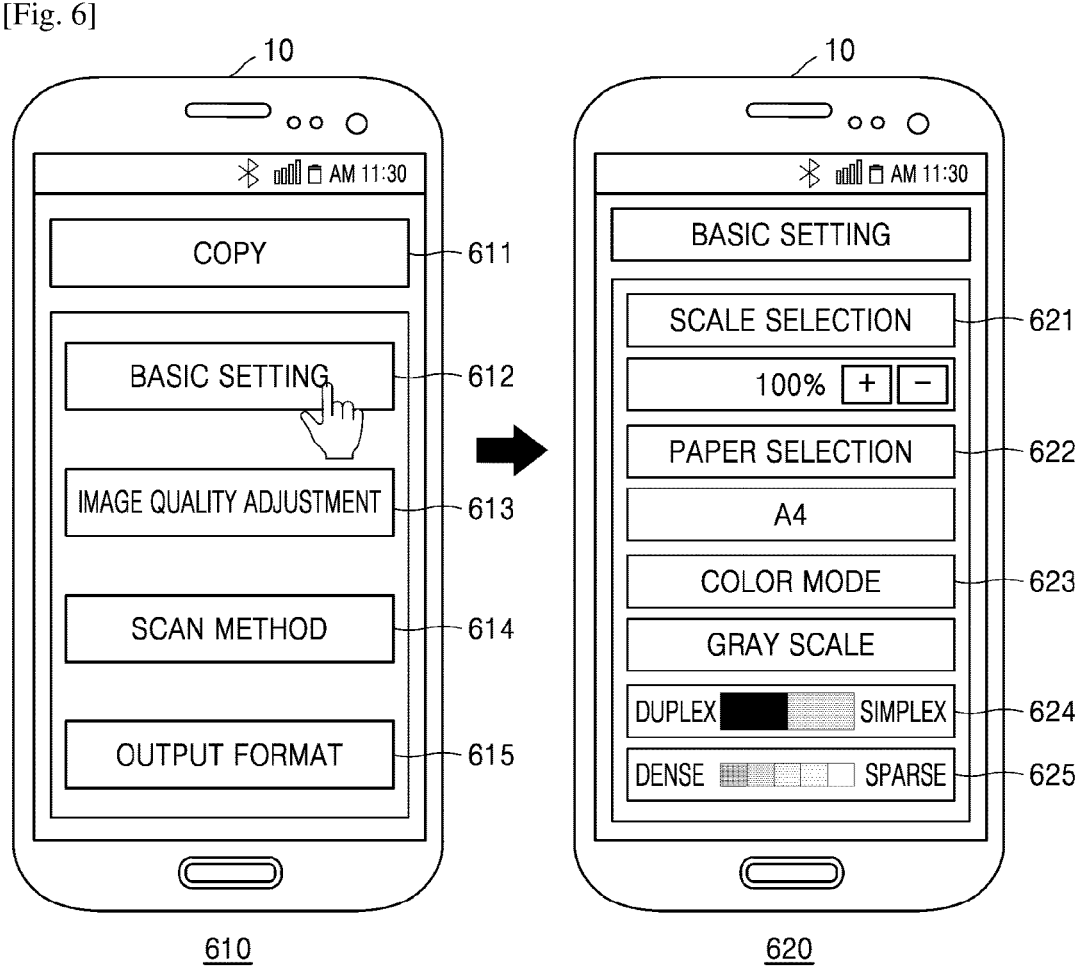

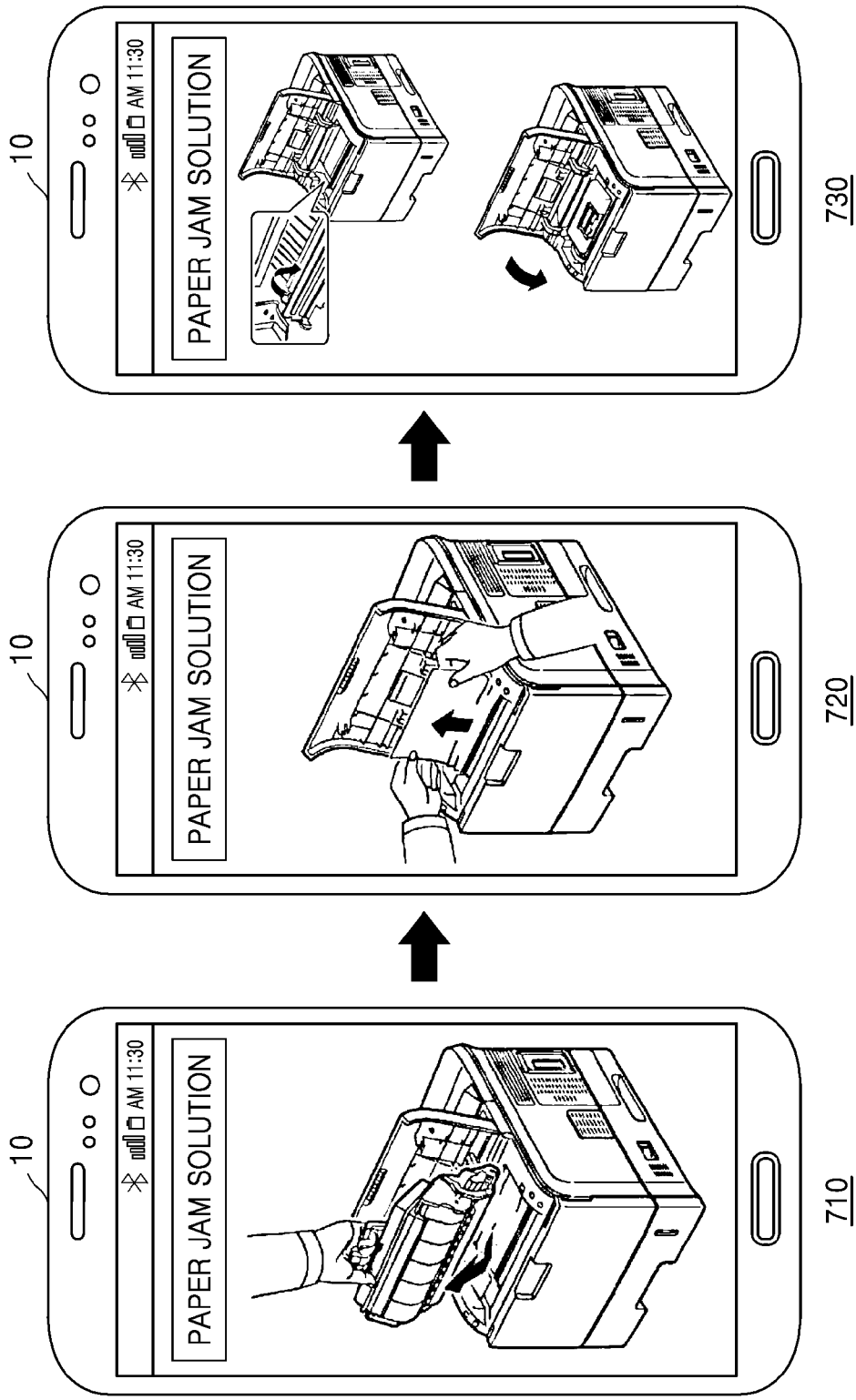

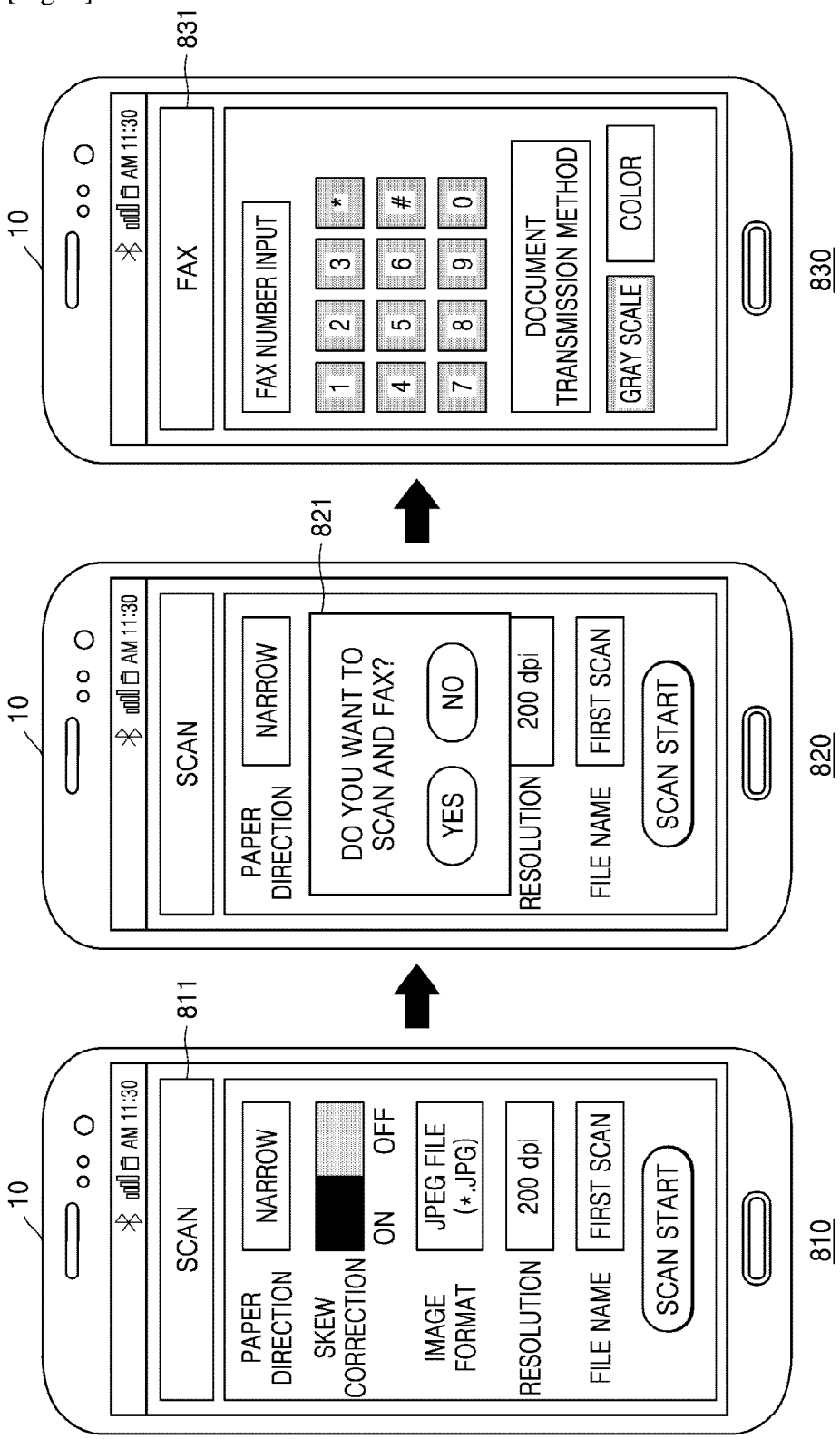

[Fig. 9]
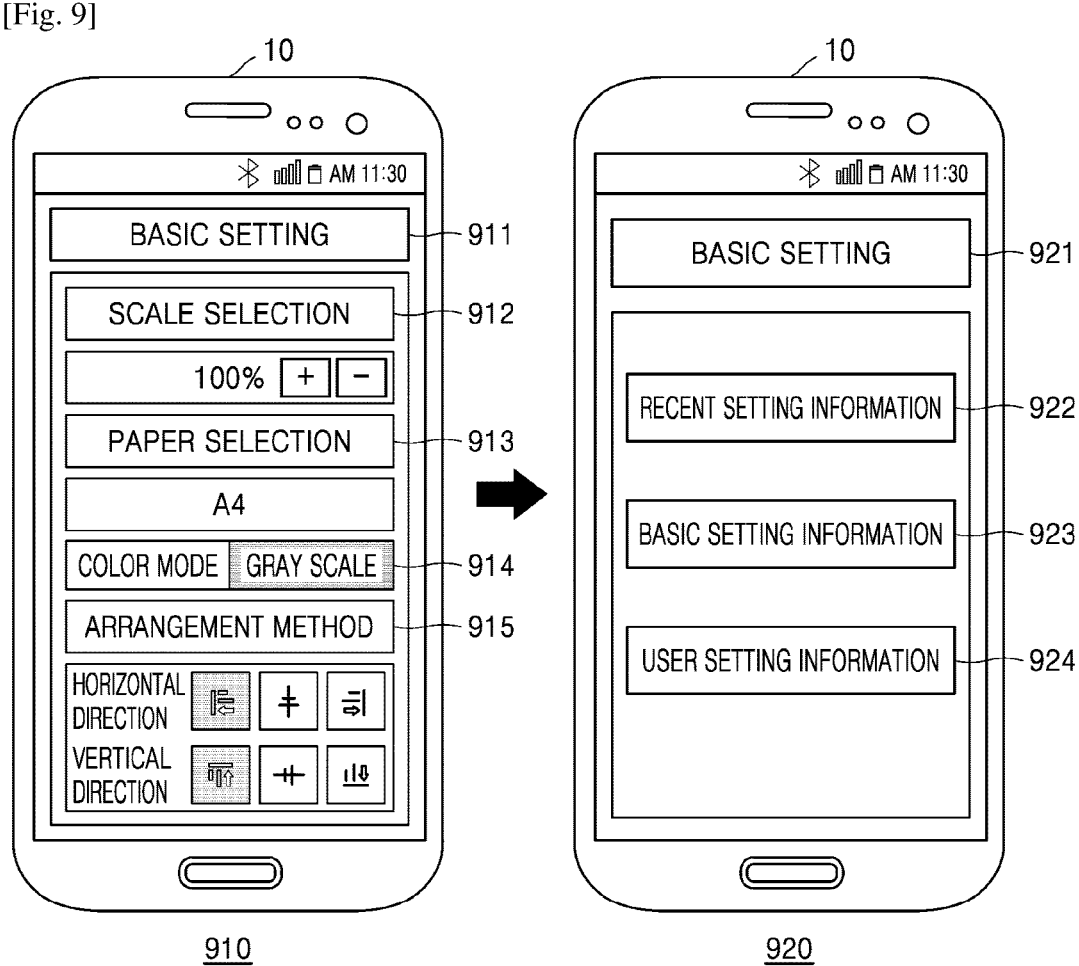

[Fig. 10]
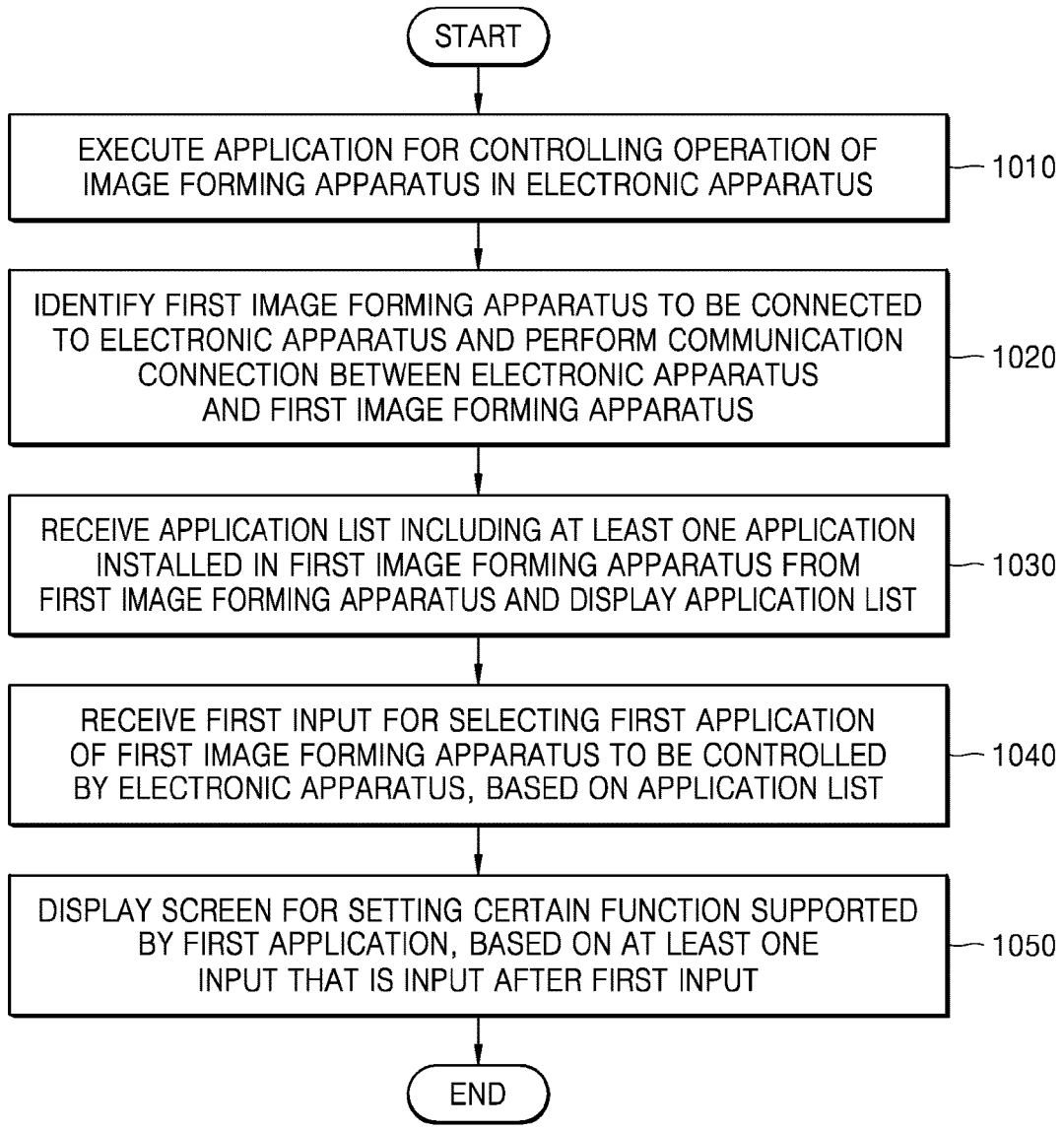

[Fig. 11]
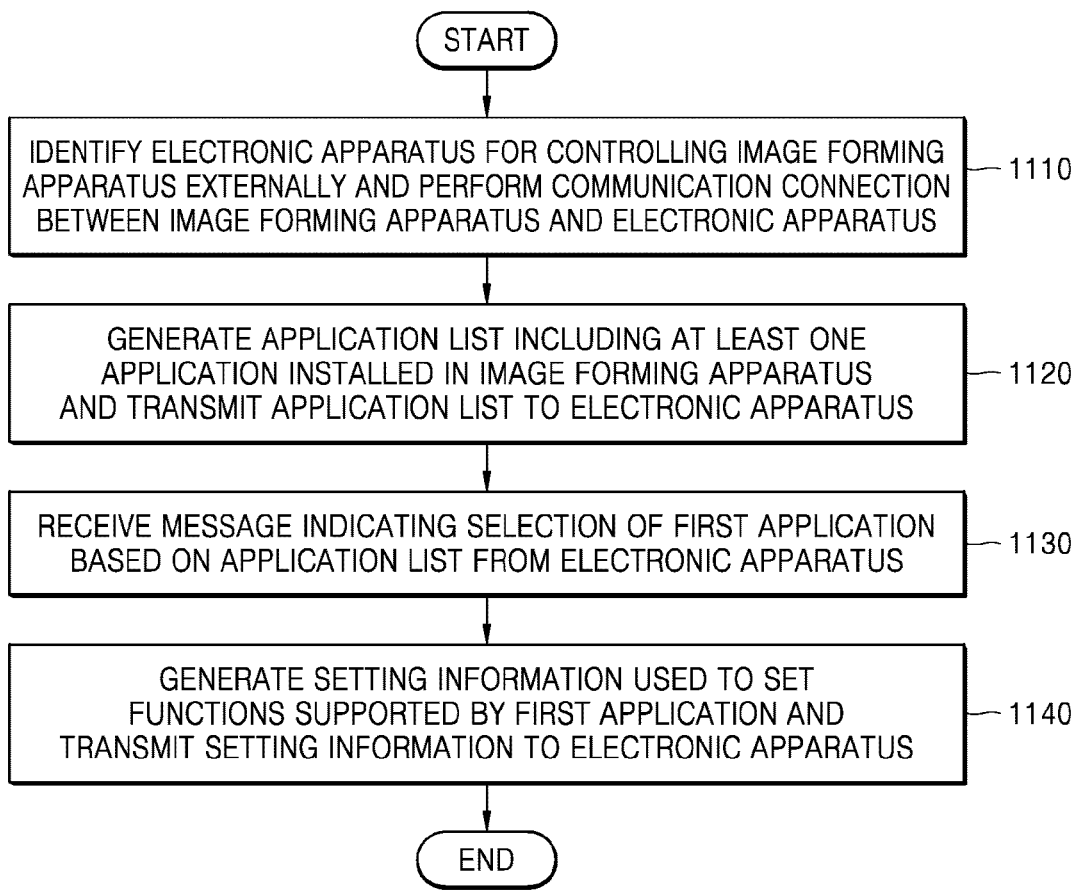

ELECTRONIC APPARATUS FOR PROVIDING USER INTERFACE OF IMAGE FORMING APPARATUS

BACKGROUND ART

An application related to an image forming operation may be installed in an image forming apparatus. When a user requests the image forming apparatus to perform an image forming operation, the user may set a function of the application related to the image forming operation according to his or her intention. The image forming apparatus may perform the image forming operation according to the function of the application set by the user.

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a diagram illustrating an operation of an electronic apparatus for providing a user interface related to an image forming apparatus, according to an example;

FIG. 2 is a diagram illustrating a configuration of an electronic apparatus according to an example;

FIG. 3 is a diagram illustrating a configuration of an image forming apparatus according to an example;

FIG. 4 is a diagram illustrating an operation of an electronic apparatus for providing a user interface related to an image forming apparatus and an operation of the image forming apparatus for transmitting information of the image forming apparatus to the electronic apparatus, according to an example;

FIG. 5 is a diagram illustrating a method of performing communication connection between an electronic apparatus and an image forming apparatus, in the electronic apparatus, according to an example;

FIG. 6 is a diagram illustrating a process of providing a screen for setting a certain function supported by an application of an image forming apparatus, in an electronic apparatus, according to an example;

FIG. 7 is a diagram illustrating a process of providing guide information for guiding an operation to be performed in an image forming apparatus, in an electronic apparatus, based on an operation state of the image forming apparatus, according to an example;

FIG. 8 is a diagram illustrating a process of providing, when a first function of a first application of an image forming apparatus is set, a screen for setting a second function of a second application related to the first function, in the electronic apparatus, according to an example;

FIG. 9 is a diagram illustrating a process of providing a user interface related to an image forming apparatus, in an electronic apparatus, according to an example;

FIG. 10 is a flowchart illustrating a method of operating an electronic apparatus connected to an image forming apparatus to provide a user interface used to control an operation of the image forming apparatus, according to an example; and FIG. 11 is a flowchart illustrating a method of operating an image forming apparatus transmitting information of the image forming apparatus to an electronic apparatus to provide a user interface of the image forming apparatus in the electronic apparatus, according to an example.

Throughout the drawings, it should be noted that like reference numbers are used to depict the same or similar elements, features, parts, components, and structures.

MODE FOR THE INVENTION

As used herein, the term "and/or" includes any and all combinations of one or more of the associated listed items. Expressions such as "at least one of," when preceding a list of elements, modify the entire list of elements and do not modify the individual elements of the list.

The term "image forming apparatus" may refer to any type of apparatus capable of performing an image forming operation, such as a printer, a scanner, a fax machine, a copier, a multi-function printer (MFP), or a display apparatus. Also, the term "print data" may refer to data converted into a printable format in a printer and the term "scan file" may refer to a file generated by scanning an image by a scanner.

Hereinafter, examples of the present disclosure will be described more fully with reference to the accompanying drawings so that those of ordinary skill in the art may easily implement the examples. However, the present disclosure may be implemented in various different forms and should not be construed as being limited to the examples described herein. To more clearly describe features of examples, matters well known to one of ordinary skill in the art to which the below examples pertain will not be described in detail.

FIG. 1 is a diagram illustrating an operation of an electronic apparatus for providing a user interface related to an image forming apparatus, according to an example.

At least one application related to an image forming operation may be installed in the image forming apparatus. Herein, the application may correspond to at least one of an application for performing a print function, an application for performing a copy function, an application for performing a scan function, an application for performing a fax function, an application for setting an environment of the image forming apparatus, an application for performing a guide function of the image forming apparatus, or the like. Also, the application may be an application for performing a combined operation of at least two of printing, copying, scanning, and faxing.

When there is no apparatus to provide a user interface in the image forming apparatus, or when a screen of the image forming apparatus is too small to provide a desirable user interface, an electronic apparatus of a user may be used as a user interface device of the image forming apparatus. Herein, the electronic apparatus may be a mobile apparatus such as a smart phone, a tablet personal computer (PC), a laptop computer, a wearable apparatus such as a smart watch, or the like.

Referring to FIG. 1, an electronic apparatus 10 may execute an application for controlling an operation of an image forming apparatus. The electronic apparatus 10 may identify a first image forming apparatus 20 and perform communication connection between the electronic apparatus 10 and the first image forming apparatus 20, according to the execution of the application. For example, the electronic apparatus 10 may establish a communication channel between the electronic apparatus 10 and the first image forming apparatus 20, according to the execution of the application. The electronic apparatus 10 may display a user interface of the first image forming apparatus 20.

The electronic apparatus 10 may receive an application list including at least one application installed in the first image forming apparatus 20 from the first image forming apparatus 20. As illustrated in FIG. 1, the electronic apparatus 10 may display an application list including an application for performing a copy function, an application for performing a scan & send function, an application for setting a storage space, and an application for setting an environment of the first image forming apparatus. The electronic apparatus 10 may receive a first input for selecting a first application from the application list. The electronic apparatus 10 may display a screen including a user interface for setting a certain function supported by the first application, based on at least one input that is input after the first input. The electronic apparatus 10 may set a certain function of the first application of the first image forming apparatus 20 based on the user interface. Also, the electronic apparatus 10 may control an operation of the first image forming apparatus 20 remotely while being connected to the first image forming apparatus 20.

FIG. 2 is a diagram illustrating a configuration of an electronic apparatus according to an example.

Referring to FIG. 2, the electronic apparatus 10 may include a communication device 210, a user interface device 220, a memory 230, and a processor 240. However, not all of the illustrated components are necessary components. The electronic apparatus 10 may be implemented by more components than the illustrated components, or may be implemented by fewer components than the illustrated components. The above components will be described below.

The communication device 210 may communicate with an external device and may be connected to a network by wire or wirelessly to communicate with the external device. Herein, the external device may be an image forming apparatus, a server, a smart phone, a tablet, a PC, a home appliance, a medical instrument, a camera, a wearable device, or the like. The communication device 210 may include a communication module, such as a transceiver, that supports one of various wired/wireless communication methods. For example, the communication module may be in the form of a chipset, may be a sticker/barcode including information necessary for communication (e.g., a sticker including a Near Field Communication (NFC) tag), or the like. Also, the communication module may be a short-range communication module, a wired communication module, or the like.

The communication device 210 may support, for example, at least one of wireless Local Area Network (LAN), Wireless Fidelity (Wi-Fi), Wi-Fi Direct, Bluetooth, Universal Serial Bus (USB), wired LAN, NFC, or the like.

The user interface device 220 may include an input unit for receiving an input for controlling an operation of the electronic apparatus 10 from the user and an output unit for displaying information such as a result of the operation of the electronic apparatus 10 or a state of the electronic apparatus 10. For example, the user interface device 220 may include an operation panel for receiving a user input and/or a display panel for displaying a screen.

The input unit may include at least one device capable of receiving various types of user inputs, such as a keyboard, a physical button, a touch screen, a camera, a microphone, or the like. Also, for example, the output unit may include a display panel, a speaker, or the like. However, the present disclosure is not limited thereto, and the user interface device 220 may include a device supporting various input/outputs.

The memory 230 may store programs, data, or files related to the electronic apparatus 10 or an image forming apparatus. The processor 240 may execute a program stored in the memory 230, read data or files stored in the memory 230, or store a new file in the memory 230. The memory 230 may store program commands, data files, data structures, or the like alone or in combination. The memory 230 may store instructions executable by the processor 240.

For example, the memory 230 may store instructions for executing an application for controlling an operation of an image forming apparatus, in the electronic apparatus 10. The processor 240 may execute the instructions stored in the memory 230.

The processor 240 may control an overall operation of the image forming apparatus, and may include at least one processor such as a central processing unit (CPU). The processor 240 may control other components included in the electronic apparatus 10 to perform an operation corresponding to a user input received through the user interface device 220. The processor 240 may include at least one specialized processor corresponding to each function, or may be a processor in the form of a single unit.

The processor 240 may execute an application for controlling an operation of the image forming apparatus, in the electronic apparatus 10.

For example, the processor 240 may execute an application for controlling an operation of the image forming apparatus, in the electronic apparatus 10, based on a user input that is input through the user interface device 220.

As another example, when the electronic apparatus 10 is located within a pre-set distance from the first image forming apparatus 20, the processor 240 may recognize a tag, such as an NFC tag, attached to the first image forming apparatus 20 through the communication device 210 and execute an application for controlling an operation of the image forming apparatus. As an example, the processor 240 may automatically execute an application for controlling an operation of the image forming apparatus upon recognition of the tag.

The processor 240 may identify the first image forming apparatus 20 to be connected to the electronic apparatus 10. The processor 240 may control to perform the communication connection between the electronic apparatus 10 and the first image forming apparatus 20.

For example, the processor 240 may display an option screen for selecting a communication connection method between the electronic apparatus 10 and the first image forming apparatus 20 through the user interface device 220. The processor 240 may receive an input for selecting a first communication method, based on the option screen, through the user interface device 220. Based on the first communication method, the processor 240 may attempt the communication connection between the electronic apparatus 10 and the first image forming apparatus 20 through the communication device 210 and identify the first image forming apparatus 20. When the first image forming apparatus 20 is identified, the processor 240 may control the communication device 210 to maintain the communication connection between the electronic apparatus 10 and the first image forming apparatus 20.

The processor 240 may receive an application list including at least one application installed in the first image forming apparatus 20 from the first image forming apparatus 20 through the communication device 210. For example, the application list may include all applications installed in the first image forming apparatus 20. As another example, the application list may include only applications that are used a certain number of times or more for a certain time period in the first image forming apparatus 20, among the applications installed in the first image forming apparatus 20. As another example, the application list may include an application executed by the user of the electronic apparatus 10.

The processor 240 may display the application list through the user interface device 220. The processor 240 may display the application list through the user interface device 220 based on the number of times the application has been executed in the first image forming apparatus 20 or the number of times the user of the electronic apparatus 10 has executed the application. Under the control of the processor 240, the user interface device 220 may display the application list by arranging the applications in descending order of the number of times of execution. As another example, the user interface device 220 may display the application list by arranging the applications in alphabetical order, in order of most recent use, in order based on user preference, or the like.

The processor 240 may receive a first input for selecting a first application in the first image forming apparatus 20 to be controlled by the electronic apparatus 10, based on the application list. For example, the application list may include an application supporting a copy function, an application supporting a scan function, an application supporting a print function, an application supporting a fax function, an application supporting the configuration of the first image forming apparatus 20, or the like. When the user wants to perform a copying operation in the first image forming apparatus 20, the user may select an application supporting a copy function from the application list displayed on the electronic apparatus 10. The processor 240 of the electronic apparatus 10 may receive an input for selecting an application supporting a copy function through the user interface device 220.

The processor 240 may display a screen for setting a certain function supported by the first application through the user interface device 220, based on at least one input that is input after the first input.

On a screen provided to set a certain function, when an input for selecting a sub-item from an upper item is received through the user interface device 220, the processor 240 may control the user interface device 220 to display a user interface corresponding to the sub-item. For example, the processor 240 may transmit a message indicating the selection of the sub-item to the first image forming apparatus 20 through the communication device 210. The processor 240 may receive setting information corresponding to the sub-item from the first image forming apparatus 20 through the communication device 210. The processor 240 may control the user interface device 220 to display the user interface corresponding to the sub-item.

The user interface device 220 may receive a second input for setting a certain function based on the user interface corresponding to the sub-item. Based on the second input, through the communication device 210, the processor 240 may request the first image forming apparatus 20 to set a certain function of the first application.

For example, the user interface device 220 may display a screen for setting a copy function. The user interface device 220 may display an upper item of the copy function including a "basic setting" item and an "output format" item. The user interface device 220 may receive an input for selecting a first item from among the upper item. The user interface device 220 may display sub-items of the first item and a user interface for setting the sub-items. For example, the processor 240 may transmit a message indicating the selection of the first item to the first image forming apparatus 20 through the communication device 210. The first image forming apparatus 20 may generate information about sub-items of the first item and a user interface used to set the subitems. The processor 240 may receive the information about the sub-items of the first item and the user interface used to set the sub-items from the first image forming apparatus 20 through the communication device 210. The user interface device 220 may display sub-items of the first item and a user interface for setting the sub-items.

The user interface displayed on the electronic apparatus 10 may change dynamically or adaptively according to the installed application or the function provided by the first image forming apparatus 20 connected to the electronic apparatus 10. For example, a framework for displaying a user interface may be installed in the electronic apparatus 10. The user interface generated from the framework may vary according to input information. Herein, the input information may be input information for selecting a certain function of a certain application installed in the first image forming apparatus 20 or input information for setting a certain function.

The user interface device 220 may receive an input for setting a first function of the first application. The processor 240 may control the user interface device 220 to display a screen for setting a second function of a second application related to the first function. For example, when the first function is set in an application supporting a scan function, the processor 240 may control the user interface device 220 to display a screen for setting a function of faxing a scanned document. For example, when the user interface device 220 receives an input for setting a first function in an application supporting a scan function, the communication device 210 may transmit a message indicating the reception of the input for setting the first function in the application supporting the scan function to the first image forming apparatus 20. The first image forming apparatus 20 may generate setting information of an application supporting a fax function related to the scan function and transmit the setting information to the electronic apparatus 10. Based on the setting information, the processor 240 may control the user interface device 220 to display a screen for setting a second function of an application supporting a fax function.

The processor 240 may construct functions supported by the first application in descending order of the frequency of use and generate a first list provided to set the functions of the first application. For example, the frequency of use may be considered based on the user of the electronic apparatus 10 or based on the user of the first image forming apparatus 20. Based on the first list, the processor 240 may control the user interface device 220 to display a user interface for setting the functions of the first application.

According to a second input for setting the first function of the first application, the processor 240 may control the user interface device 220 to display at least one of the recent setting information of the first function, the basic setting information of the first function, the user setting information of the first function, or the like.

Based on a first operation state of the first image forming apparatus 20 and a first input for selecting the first application, the processor 240 may acquire guide information for guiding an operation to be performed in the first image forming apparatus 20 according to the first operation state. Herein, the processor 240 may acquire the guide information stored in the electronic apparatus 10, according to the first operation state of the first image forming apparatus 20. Also, the processor 240 may receive the guide information from the first image forming apparatus 20 or a server managing the first image forming apparatus 20, according to the first operation state of the first image forming apparatus 20. The user interface device 220 may display the guide information.

For example, in a state where the toner is exhausted in the first image forming apparatus 20, when an input for selecting an application supporting a copying function is received, the processor 240 may acquire guide information for guiding how to charge the toner and control the user interface device 220 to display the guide information.

As another example, when a certain application is additionally installed, updated, or deleted in the first image forming apparatus 20, the processor 240 may receive information related to the installation, update, or deletion of the certain application in the first image forming apparatus 20 through the communication device 210. The electronic apparatus 10 may display a user interface, according to the information related to the installation, update, or deletion of the certain application received from the first image forming apparatus 20, without having to change or update the application for controlling the operation of the image forming apparatus 20, in the electronic apparatus 10.

An image forming apparatus 20 may include a built-in user interface device 220. On the other hand, an image forming apparatus 20 may not include a built-in user interface device 220, or a screen of the user interface device 220 may be small, thus making it difficult to view of use a user interface in the image forming apparatus 20. When it is difficult to provide a user interface in an image forming apparatus 20, the electronic apparatus 10 may be connected to the image forming apparatus 20 to perform the function of the user interface device 220 of the image forming apparatus 20. That is, the electronic apparatus 10 may display a user interface for setting a function of an application in the image forming apparatus 20 and display information related to an image forming operation performed in the image forming apparatus 20. Since the electronic apparatus 10 may be connected to the image forming apparatus 20 to perform the function of the user interface device 220 of the image forming apparatus 20, it may be possible for the user to purchase an image forming apparatus 20 that does not include a user interface device or that includes a smaller user interface device, thus allowing for a reduction in costs.

Hereinafter, various operations or applications performed by the electronic apparatus 10 will be described. The content that may be clearly understood and expected by those of ordinary skill in the art even without specifying any configuration among the communication device 210, the user interface device 220, the memory 230, and the processor 240 of the electronic apparatus 10 may be understood as a general implementation, and the scope of the present disclosure is not limited by the physical/logical structure or the name of a particular configuration.

FIG. 3 is a diagram illustrating a configuration of an image forming apparatus according to an example.

Referring to FIG. 3, the image forming apparatus 20 may include a communication device 310, a memory 320, and a processor 330. However, not all of the illustrated components are necessary components. The image forming apparatus 20 may be implemented by more components than the illustrated components, or may be implemented by fewer components than the illustrated components. The above components will be described below.

The communication device 310 may communicate with an external device. For example, the communication device 310 may be connected to a network by wire or wirelessly to communicate with an external device. The communication device 310 may include a communication module, such as a transceiver, that supports one of various wired/wireless communication methods. For example, the communication module may be in the form of a chipset, may be a sticker/barcode including information necessary for communication (e.g., a sticker including an NFC tag), or the like. Also, the communication module may be a short-range communication module, a wired communication module, or the like.

The communication device 310 may support, for example, at least one of wireless LAN, Wi-Fi, Wi-Fi Direct, Bluetooth, USB, wired LAN, NFC, or the like.

The communication device 310 may be connected to the electronic apparatus 10 located outside the image forming apparatus 20 to transmit/receive signals or data thereto/therefrom.

The memory 320 may store programs, data, or files related to the image forming apparatus 20. The processor 330 may execute a program stored in the memory 320, read data or files stored in the memory 320, store a new file in the memory 320, or the like. The memory 320 may store program commands, data files, data structures, or the like, alone or in combination. The memory 320 may store instructions executable by the processor 330.

The processor 330 may control an overall operation of the image forming apparatus 20, and may include at least one processor such as a CPU. The processor 330 may include at least one specialized processor corresponding to each function, or may be a processor in the form of a single unit.

The processor 330 may identify the electronic apparatus 10 for controlling the image forming apparatus 20 through the communication device 310 and perform a communication connection between the image forming apparatus 20 and the electronic apparatus 10.

The processor 330 may generate an application list including at least one application installed in the image forming apparatus 20. The processor 330 may transmit the application list to the electronic apparatus 10 through the communication device 310.

The processor 330 may receive a message indicating the selection of a first application based on the application list, from the electronic apparatus 10 through the communication device 310.

The processor 330 may generate setting information used to set functions supported by the first application. The setting information may be information obtained by processing data used to set the functions supported by the first application. The processor 330 may transmit the generated setting information to the electronic apparatus 10 through the communication device 310.

The processor 330 may classify the functions supported by the first application into an upper item and a sub-item. The processor 330 may generate a list including only the upper item. Also, the processor 330 may generate only sub-items subordinate to an upper item as a separate list. The processor 330 may transmit a list corresponding to the items requested by the electronic apparatus 10 to the electronic apparatus 10 through the communication device 310.

The processor 330 may receive a message indicating the selection of a first function of the first application from the electronic apparatus 10 through the communication device 310. The processor 330 may generate first setting information used to set the first function in a hierarchical structure including an upper item and a sub-item.

When a message indicating the selection of the first function of the first application is received, the processor 330 may generate second setting information used to set a second function of a second application related to the first function of the first application. The processor 330 may transmit the second setting information to the electronic apparatus 10 through the communication device 310.

The processor 330 may construct functions supported by the first application in descending order of the frequency of use and generate setting information used to set the functions. The processor 330 may transmit the generated setting information to the electronic apparatus 10 through the communication device 310.

Based on a first operation state of the image forming apparatus 20, the processor 330 may acquire guide information for guiding an operation to be performed in the image forming apparatus 20 according to the first operation state. The processor 330 may transmit the guide information to the electronic apparatus 10 through the communication device 310.

Hereinafter, examples of various operations or applications performed by the image forming apparatus 20 will be described. The content that may be clearly understood and expected by those of ordinary skill in the art even without specifying any configuration among the communication device 310, the memory 320, and the processor 330 of the image forming apparatus 20 may be understood as a general implementation, and the scope of the present disclosure is not limited by the physical/logical structure or the name of a particular configuration.

FIG. 4 is a diagram illustrating an operation of an electronic apparatus for providing a user interface related to an image forming apparatus and an operation of the image forming apparatus for transmitting information of the image forming apparatus to the electronic apparatus, according to an example.

Referring to FIG. 4, the electronic apparatus 10 may execute an application for controlling an operation of an image forming apparatus in operation 410.

In operation 420, the electronic apparatus 10 may identify the first image forming apparatus 20 to be connected to the electronic apparatus 10 and attempt the communication connection between the electronic apparatus 10 and the first image forming apparatus 20.

In operation 425, the electronic apparatus 10 may perform the communication connection between the electronic apparatus 10 and the first image forming apparatus 20.

In operation 430, the first image forming apparatus 20 may generate an application list including at least one application installed in the first image forming apparatus 20.

In operation 435, the first image forming apparatus 20 may transmit the application list to the electronic apparatus 10. The electronic apparatus 10 may display the application list received from the first image forming apparatus 20.

In operation 440, the electronic apparatus 10 may receive, based on the application list, a first input for selecting a first application of the first image forming apparatus 20 to be controlled by the electronic apparatus 10.

In operation 445, the electronic apparatus 10 may transmit a message indicating the selection of the first application to the first image forming apparatus 20.

In operation 450, the first image forming apparatus 20 may generate setting information used to set functions supported by the first application. The setting information may be information obtained by processing data used to set the functions supported by the first application. For example, the first image forming apparatus 20 may classify the functions supported by the first application into an upper item and a sub-item. The first image forming apparatus 20 may generate a list including only the upper item. Also, the first image forming apparatus 20 may generate only sub-items subordinate to a first upper item as a separate list. Further, the first image forming apparatus 20 may generate a list including both the upper item and the sub-items.

In operation 455, the first image forming apparatus 20 may transmit the setting information used to set the functions supported by the first application to the electronic apparatus 10.

In operation 460, the electronic apparatus 10 may display a screen for setting a certain function supported by the first application, based on the setting information received from the first image forming apparatus 20.

In operation 470, the electronic apparatus 10 may receive a second input for setting a certain function. The electronic apparatus 10 may set a certain function of the first application based on the second input.

FIG. 5 is a diagram illustrating a method of performing communication connection between an electronic apparatus and an image forming apparatus, in the electronic apparatus, according to an example.

Referring to FIG. 5, the electronic apparatus 10 may display an option screen 511 for selecting a communication connection method between the electronic apparatus 10 and the first image forming apparatus 20 as illustrated in screen 510. The electronic apparatus 10 may communicate with the first image forming apparatus 20 according to various types of communication connection methods. For example, the electronic apparatus 10 may include at least one of a Wi-Fi chip, a Bluetooth chip, an NFC chip, a wireless communication chip, or the like. The electronic apparatus 10 may communicate with the first image forming apparatus 20 through a communication device.

The Wi-Fi chip and the Bluetooth chip may perform communication by a Wi-Fi method and a Bluetooth method, respectively. When the Wi-Fi chip or the Bluetooth chip is used, various connection information such as a service set identifier (SSID) and a session key may be first transmitted/received and various communication information may be transmitted/received after communication connection is performed by using the various connection information. The NFC chip may refer to a chip operating in an NFC method using a 13.56 MHz band among various Radio Frequency Identification (RF-ID) frequency bands. The wireless communication chip may refer to a chip performing communication according to various communication standards such as Institute of Electrical and Electronics Engineers (IEEE), ZigBee, 3rd Generation (3G), 3rd Generation Partnership Project (3GPP), Long Term Evolution (LTE), 5th Generation (5G), or the like.

As illustrated in screen 510, the electronic apparatus 10 may display the option screen 511 for selecting a Wi-Fi method, a Bluetooth method, or an NFC method. In the illustrated example, the electronic apparatus 10 may receive an input for selecting the Bluetooth method. Of course, screen 510 is only an example of an option screen and additional or fewer communication methods may be displayed.

As illustrated in screen 520, the electronic apparatus 10 may display a list of external devices that may be connected to the electronic apparatus 10 according to the Bluetooth method. The electronic apparatus 10 may receive an input 521 for selecting the first image forming apparatus 20 in the list of external devices. The electronic apparatus 10 may transmit a session establishment request to the first image forming apparatus 20. Herein, the session may refer to a logical connection for communicating data between the electronic apparatus 10 and the first image forming apparatus 20. The first image forming apparatus 20 may generate a session ID of the electronic apparatus 10 and transmit the session ID to the electronic apparatus 10. The electronic apparatus 10 may communicate with the first image forming apparatus 20 by using the session ID.

FIG. 6 is a diagram illustrating a process of providing a screen for setting a certain function supported by an application of an image forming apparatus, in an electronic apparatus, according to an example.

Referring to FIG. 6, the electronic apparatus 10 may receive an application list including at least one application installed in the first image forming apparatus 20 from the first image forming apparatus 20. For example, the application list may include an application for performing a copy function, an application for performing a print function, an application for performing a scan function, an application for performing a fax function, a workform application for performing a combination of at least two functions, or the like. In the example of FIG. 6, the electronic apparatus 10 may receive a first input for selecting an application performing a copy function in the application list.

As illustrated in screen 610, the electronic apparatus 10 may display a screen for setting functions supported by an application 611 supporting the copy function. For example, the electronic apparatus 10 may display a user interface for selecting a basic setting item 612, an image quality adjustment item 613, a scan method item 614, or an output format item 615. In the illustrated example, the electronic apparatus 10 may receive an input for selecting the basic setting item 612.

On a screen provided to set a certain function, when an input for selecting a sub-item from an upper item is received, the electronic apparatus 10 may display the sub-item and a user interface corresponding to the sub-item. For example, the electronic apparatus 10 may transmit a message indicating the selection of the sub-item to the first image forming apparatus 20. The electronic apparatus 10 may receive setting information corresponding to the sub-item from the first image forming apparatus 20 and display a user interface corresponding to the sub-item based on the setting information.

Also, the electronic apparatus 10 may display all of the sub-items included in the upper item or may display only the sub-items selected according to a certain criterion among all the sub-items included in the upper item. For example, the certain criterion may be a criterion for selecting only the items reset by changing the values of items a certain number of times or more with respect to the user of the electronic apparatus 10. As another example, the certain criterion may be a criterion for selecting only the items reset by changing the values of items a certain number of times or more with respect to the user of the image forming apparatus 20.

As illustrated in screen 620, the electronic apparatus 10 may display certain sub-items 621, 622, 623, 624, and 625 included in the basic setting item 612 and a user interface for setting the sub-items 621, 622, 623, 624, and 625. For example, the electronic apparatus 10 may display an item 621 for setting a copy scale, an item 622 for setting a copy paper sheet, an item 623 for setting a color mode of a copy, an item 624 for setting a simplex or duplex copy, an item 625 for setting the density of an output that is output by the copy, or the like.

Herein, the sub-items 621, 622, 623, 624, and 625 may be items for which the setting has been changed a certain number of times or more while the user of the electronic apparatus 10 is performing a copy operation in the first image forming apparatus 20. Also, the sub-items 621, 622, 623, 624, and 625 may be arranged and displayed on the screen in descending order of the frequency of use with respect to the user of the electronic apparatus 10. The electronic apparatus 10 may acquire information about the items frequently used by the user, based on the information of the user recorded in the electronic apparatus 10. Also, the first image forming apparatus 20 or a server of the first image forming apparatus 20 may acquire the information of the items frequently used by the user of the electronic apparatus 10, based on the login record information of the electronic apparatus 10. The electronic apparatus 10 may acquire the information of the items frequently used in the electronic apparatus 10 from the first image forming apparatus 20 or the server of the first image forming apparatus 20.

In an example, the electronic apparatus 10 may receive a second input for adjusting the density in a user interface corresponding to the item 625 for setting the density of the output and request the first image forming apparatus 20 to set the density of the output according to the second input.

FIG. 7 is a diagram illustrating a process of providing guide information for guiding an operation to be performed in an image forming apparatus, in an electronic apparatus, based on an operation state of the image forming apparatus, according to an example.

Referring to FIG. 7, based on a first operation state of the first image forming apparatus 20 and a first input for selecting the first application in the application list, the electronic apparatus 10 may acquire guide information for guiding an operation to be performed in the first image forming apparatus 20 according to the first operation state. The electronic apparatus 10 may display the guide information on the screen or output the same by voice.

For example, the first image forming apparatus 20 may be in a paper-jam state, and the electronic apparatus 10 may receive an input for selecting an application performing a copy function. An operation of removing the jammed paper should be first performed in order to perform a copy operation in the first image forming apparatus 20. Thus, the electronic apparatus 10 may acquire guide information for guiding a method of removing the jammed paper from the first image forming apparatus 20. The electronic apparatus 10 may acquire the guide information from the data stored in the electronic apparatus 10, from the first image forming apparatus 20, or a server managing the first image forming apparatus 20.

As illustrated in FIG. 7, the electronic apparatus 10 may display the guide information about a paper jam solution in a time-sequential manner. Referring to screen 710, the electronic apparatus 10 may display first guide information for guiding an operation of opening a top cover of the first image forming apparatus 20 and extracting a toner cartridge therefrom. Referring to screen 720, the electronic apparatus 10 may display second guide information for guiding an operation of removing the paper jammed in the first image forming apparatus 20. Referring to screen 730, the electronic apparatus 10 may display third guide information for guiding an operation of reloading the toner cartridge together with an operation of handling a certain part of the first image forming apparatus 20.

FIG. 8 is a diagram illustrating a process of providing, when a first function of a first application of an image forming apparatus is set, a screen for setting a second function of a second application related to the first function, in the electronic apparatus, according to an example.

According to an input for setting a first function of a first application, the electronic apparatus 10 may display a screen for setting a second function of a second application related to the first function.

Referring to FIG. 8, when an input for setting a certain function of an application 811 performing a scan function in the electronic apparatus 10 is received, the electronic apparatus 10 may display a message related to a fax operation that may be performed after the scan operation. The electronic apparatus 10 may display a screen for setting a certain function of an application 831 performing a fax function.

As an example, referring to screen 810, the electronic apparatus 10 may display items for setting certain functions of the application 811 performing a scan function. For example, the electronic apparatus 10 may display items about a paper direction, a skew correction, an image format, a resolution, a file name and a user interface for setting each of the items, or the like. For example, the electronic apparatus 10 may receive an input for setting the resolution. As illustrated in screen 820, the electronic apparatus 10 may display a message 821 "Do you want to scan and fax?" The electronic apparatus 10 may receive an input for selecting "YES." Then, as illustrated in screen 830, the electronic apparatus 10 may display a screen for setting certain functions of the application 831 performing a fax function. For example, the electronic apparatus 10 may receive a fax number and may also receive an input for selecting a transmission method of the fax.

FIG. 9 is a diagram illustrating a process of providing a user interface related to an image forming apparatus, in an electronic apparatus, according to an example.

Referring to FIG. 9, the electronic apparatus 10 may display a screen for setting a certain function supported by a first application. The electronic apparatus 10 may construct functions supported by the first application in descending order of the frequency of use and generate a first list provided to set the functions. The electronic apparatus 10 may display a user interface for setting the functions based on the first list.

Referring to screen 910, the electronic apparatus 10 may display sub-items included in a basic setting item 911 in an application supporting a copy function. The electronic apparatus 10 may extract only some items 912, 913, 914, and 915 among the sub-items included in the basic setting item 911 and generate a first list provided to set details of the extracted items 912, 913, 914, and 915. Herein, by considering the frequency of use by the user of the electronic apparatus 10, the electronic apparatus 10 may extract only the items 912, 913, 914, and 915 reset by changing the values of items a certain number of times or more. For example, the electronic apparatus 10 may generate a first list by extracting an item 912 for setting a copy scale, an item 913 for setting a copy paper sheet, an item 914 for setting a color mode of a copy, an item 915 for setting a method of arranging the output, or the like. In this case, the electronic apparatus 10 may display a user interface for setting details of each item. The electronic apparatus 10 may receive an input for setting details of at least one of the items 912, 913, 914, and 915 (e.g., the copy scale is 100%, the paper size is A4, and the color mode is a grayscale mode).

Referring to screen 920, based on an input for setting a first function of the first application, the electronic apparatus 10 may display a user interface for displaying at least one of recent setting information of the first function, basic setting information of the first function, and user setting information of the first function. For example, when an input for selecting a basic setting item 921 in an application performing a scan function is received in the electronic apparatus 10, with respect to the basic setting item 921, the electronic apparatus 10 may display a user interface 922 for providing information indicating that the basic setting item 921 is recently set, a user interface 923 for providing information that is basically set in the basic setting item 921, and a user interface 924 for providing information indicating that the basic setting item 921 is set by the user of the electronic apparatus 10. The electronic apparatus 10 may receive an input for selecting one of the user interfaces 922, 923, and 924 and display information of the basic setting item 921 according to the received input.

FIG. 10 is a flowchart illustrating a method of operating an electronic apparatus connected to an image forming apparatus to provide a user interface used to control an operation of the image forming apparatus, according to an example.

Referring to FIG. 10, the electronic apparatus 10 may execute an application for controlling an operation of the image forming apparatus, in the electronic apparatus 10 in operation 1010.

For example, the electronic apparatus 10 may execute an application for controlling an operation of the image forming apparatus, in the electronic apparatus 10, based on a user input that is input through the user interface device.

As another example, when the electronic apparatus 10 is located within a pre-set distance from the first image forming apparatus 20, the electronic apparatus 10 may recognize a tag, such as an NFC tag, attached to the first image forming apparatus 20 and automatically execute an application for controlling an operation of the image forming apparatus.

In operation 1020, the electronic apparatus 10 may identify the first image forming apparatus 20 to be connected to the electronic apparatus 10 and perform the communication connection between the electronic apparatus 10 and the first image forming apparatus 20.

For example, the electronic apparatus 10 may display an option screen for selecting the communication connection method between the electronic apparatus 10 and the first image forming apparatus 20. Based on the option screen, the electronic apparatus 10 may receive an input for selecting a first communication method. Based on the first communication method, the electronic apparatus 10 may attempt the communication connection between the electronic apparatus 10 and the first image forming apparatus 20 and identify the first image forming apparatus 20. When the first image forming apparatus 20 is identified, the electronic apparatus 10 may control the communication device of the electronic apparatus 10 to maintain the communication connection between the electronic apparatus 10 and the first image forming apparatus 20.

In operation 1030, the electronic apparatus 10 may receive an application list including at least one application installed in the first image forming apparatus 20 from the first image forming apparatus 20. The electronic apparatus 10 may display the application list through the user interface device of the electronic apparatus 10.

In operation 1040, the electronic apparatus 10 may receive a first input for selecting a first application in the first image forming apparatus 20 to be controlled by the electronic apparatus 10, based on the application list.

In operation 1050, the electronic apparatus 10 may display a screen for setting a certain function supported by the first application, based on at least one input that is input after the first input.

When an input for selecting a sub-item from an upper item is input on a screen provided to set the certain function, the electronic apparatus 10 may transmit a message indicating the selection of the sub-item to the first image forming apparatus. The electronic apparatus 10 may receive setting information corresponding to the sub-item from the first image forming apparatus 20 and display a user interface corresponding to the sub-item based on the setting information.

The electronic apparatus 10 may receive a second input for setting a certain function based on the user interface corresponding to the sub-item. Based on the second input, the electronic apparatus 10 may request the first image forming apparatus 20 to set a certain function of the first application.

Based on the first input and a first operation state of the first image forming apparatus 20, the electronic apparatus 10 may acquire guide information for guiding an operation to be performed in the first image forming apparatus 20 according to the first operation state. The electronic apparatus 10 may display the guide information through the user interface device of the electronic apparatus 10.

According to an input for setting a first function of a first application, the electronic apparatus 10 may display a screen for setting a second function of a second application related to the first function.

The electronic apparatus 10 may construct functions supported by the first application in descending order of the frequency of use and generate a first list provided to set the functions. The electronic apparatus 10 may display a user interface for setting the functions, based on the first list, through the user interface device.

According to a second input for setting the first function of the first application, the electronic apparatus 10 may display at least one of the recent setting information of the first function, the basic setting information of the first function, and the user setting information of the first function.

FIG. 11 is a flowchart illustrating a method of operating an image forming apparatus transmitting information of the image forming apparatus to an electronic apparatus to provide a user interface of the image forming apparatus in the electronic apparatus, according to an example.

Referring to FIG. 11, the image forming apparatus 20 may identify the electronic apparatus 10 for controlling the image forming apparatus 20 externally and perform the communication connection between the identified electronic apparatus 10 and the image forming apparatus 20 in operation 1110.

In operation 1120, the image forming apparatus 20 may generate an application list including at least one application installed in the image forming apparatus 20. The image forming apparatus 20 may transmit the application list to the electronic apparatus 10.

In operation 1130, the image forming apparatus 20 may receive a message indicating the selection of the first application, based on the application list, from the electronic apparatus 10.

In operation 1140, the image forming apparatus 20 may generate setting information used to set functions supported by the first application. The image forming apparatus 20 may transmit the generated application list to the electronic apparatus 10.

The image forming apparatus 20 may receive a message indicating the selection of a first function of the first application from the electronic apparatus 10. The image forming apparatus 20 may generate first setting information used to set the first function in a hierarchical structure including an upper item and a sub-item. The image forming apparatus 20 may transmit the first setting information to the electronic apparatus 10.

Also, based on a first operation state of the image forming apparatus 20, the image forming apparatus 20 may acquire guide information for guiding an operation to be performed in the image forming apparatus 20 according to the first operation state. The image forming apparatus 20 may transmit the guide information to the electronic apparatus 10.

When a message indicating the selection of the first function of the first application is received from the electronic apparatus 10, the image forming apparatus 20 may generate second setting information used to set a second function of a second application related to the first function of the first application. The image forming apparatus 20 may transmit the second setting information to the electronic apparatus 10.

The electronic apparatus 10 may construct functions supported by the first application in descending order of the frequency of use and generate setting information used to set the functions.

The above method of operating the electronic apparatus 10 and the image forming apparatus 20 may be implemented in the form of a computer-readable storage medium storing instructions or data executable by a computer or a processor. It may be written as a program executable in a computer and may be implemented in a general-purpose digital computer that operates the program by using a computer-readable storage medium. The computer-readable storage medium may be Read-Only Memory (ROM), Random-Access Memory (RAM), flash memories, Compact Disk Read-Only Memory (CD-ROM), Compact Disk Recordable (CD-R), CD+R, Compact Disk Rewritable (CD-RW), CD+RW, Digital Versatile Disk Read-Only Memory (DVD-ROM), Digital Versatile Disk Recordable (DVD-R), DVD+R, Digital Versatile Disk Rewritable (DVD-RW), DVD+RW, Digital Versatile Disk Random-Access Memory (DVD-RAM), Blu-ray Disk Read-Only Memory (BD-ROM), Blu-ray Disk Recordable (BD-R), Blu-ray Disk Recordable Low to High (BD-R LTH), Blu-ray Disk Recordable Erasable (BD-RE), magnetic tapes, floppy disks, magneto-optical data storages, optical data storages, hard disks, Solid-State Disk (SSD), or any device that may store instructions or software, related data, data files, and data structures and may provide instructions or software, related data, data files, and data structures to a processor or computer to enable the processor or computer to execute instructions.

While the present disclosure has been described with reference to the drawings and particular examples, those of ordinary skill in the art may make various changes and modifications therein without departing from the spirit and scope of the present disclosure. For example, the described techniques may be performed in a different order than the described method, and/or the described components such as systems, structures, devices, and circuits may be united or combined in a different form than the described method or may be replaced or substituted by other components or equivalents thereof.

Therefore, the scope of the present disclosure should not be limited to the described examples but should be defined by the following claims and equivalents thereof.

The invention claimed is:

1. A method of operating an electronic apparatus, the method comprising:
    executing an application for controlling an operation of an image forming apparatus, in the electronic apparatus;
    identifying a first image forming apparatus to be connected to the electronic apparatus and performing communication connection between the electronic apparatus and the first image forming apparatus;

receiving an application list including at least one application installed in the first image forming apparatus from the first image forming apparatus and displaying the application list;

receiving a first input for selecting a first application of the first image forming apparatus to be controlled by the electronic apparatus, based on the application list; and displaying a screen for setting a certain function supported by the first application, based on at least one input that is input after the first input, wherein the displaying of the screen for setting the certain function supported by the first application, based on the at least one input that is input after the first input, comprises:

when an input for selecting a sub-item from an upper item is received on a screen provided to set the certain function, transmitting a message indicating selection of the sub-item to the first image forming apparatus; and receiving setting information corresponding to a sub-item from the first image forming apparatus and displaying a user interface corresponding to the sub-item based on the setting information.

2. The method of claim 1, further comprising:

receiving a second input for setting the certain function, based on the user interface corresponding to the sub-item; and requesting the first image forming apparatus to set the certain function of the first application, based on the second input.

3. The method of claim 1, wherein the performing of the communication connection between the electronic apparatus and the first image forming apparatus comprises:

displaying an option screen for selecting a communication connection method between the electronic apparatus and the first image forming apparatus;

receiving an input for selecting a first communication method, based on the option screen; and identifying the first image forming apparatus and performing the communication connection between the electronic apparatus and the first image forming apparatus, based on the first communication method.

4. The method of claim 1, further comprising, based on the first input and a first operation state of the first image forming apparatus, acquiring guide information for guiding an operation to be performed in the first image forming apparatus according to the first operation state.

5. The method of claim 1, wherein the displaying of the screen for setting the certain function supported by the first application, based on the at least one input that is input after the first input, comprises displaying, according to an input for setting a first function of the first application, a screen for setting a second function of a second application related to the first function.

6. The method of claim 1, wherein the displaying of the screen for setting the certain function supported by the first application, based on the at least one input that is input after the first input, comprises:

constructing functions supported by the first application in descending order of frequency of use and generating a first list provided to set the functions; and displaying a user interface for setting the functions on the screen, based on the first list.

7. The method of claim 1, wherein the displaying of the screen for setting the certain function supported by the first application, based on the at least one input that is input after the first input, comprises displaying, according to a second input for setting a first function of the first application, at least one of recent setting information of the first function, basic setting information of the first function, or user setting information of the first function.

8. The method of claim 1, wherein the executing of the application for controlling the operation of the image forming apparatus, in the electronic apparatus, comprises, when the electronic apparatus is located within a pre-set distance from the first image forming apparatus, recognizing a tag attached to the first image forming apparatus by the electronic apparatus and automatically executing the application for controlling an operation of the first image forming apparatus.

9. A non-transitory computer-readable storage medium storing instructions executable by a processor, the non-transitory computer-readable storage medium comprising:

instructions for executing an application for controlling an operation of an image forming apparatus, in an electronic apparatus;

instructions for identifying a first image forming apparatus to be connected to the electronic apparatus and performing communication connection between the electronic apparatus and the first image forming apparatus;

instructions for receiving an application list including at least one application installed in the first image forming apparatus from the first image forming apparatus and displaying the application list;

instructions for receiving a first input for selecting a first application of the first image forming apparatus to be controlled by the electronic apparatus, based on the application list; and instructions for displaying a screen for setting a certain function supported by the first application, based on at least one input that is input after the first input, wherein the instructions for displaying of the screen for setting the certain function supported by the first application, based on the at least one input that is input after the first input, comprise:

instructions for, when an input for selecting a sub-item from an upper item is received on a screen provided to set the certain function, transmitting a message indicating selection of the sub-item to the first image forming apparatus; and instructions for receiving setting information corresponding to a sub-item from the first image forming apparatus and displaying a user interface corresponding to the sub-item based on the setting information.

10. The non-transitory computer-readable storage medium of claim 9, further comprising:

instructions for receiving a second input for setting the certain function, based on the user interface corresponding to the sub-item; and instructions for requesting the first image forming apparatus to set the certain function of the first application, based on the second input.

11. The non-transitory computer-readable storage medium of claim 9, wherein the instructions for performing the communication connection between the electronic apparatus and the first image forming apparatus comprise:

instructions for displaying an option screen for selecting a communication connection method between the electronic apparatus and the first image forming apparatus;

instructions for receiving an input for selecting a first communication method, based on the option screen; and instructions for identifying the first image forming apparatus and performing the communication connection between the electronic apparatus and the first image forming apparatus, based on the first communication method.

12. The non-transitory computer-readable storage medium of claim 9, further comprising instructions for, based on the first input and a first operation state of the first image forming apparatus, acquiring guide information for guiding an operation to be performed in the first image forming apparatus according to the first operation state.

13. The non-transitory computer-readable storage medium of claim 9, wherein the instructions for the displaying of the screen for setting the certain function supported by the first application, based on the at least one input that is input after the first input, comprise instructions for displaying, according to an input for setting a first function of the first application, a screen for setting a second function of a second application related to the first function.

14. The non-transitory computer-readable storage medium of claim 9, wherein the instructions for the displaying of the screen for setting the certain function supported by the first application, based on the at least one input that is input after the first input, comprise:
   instructions for constructing functions supported by the first application in descending order of frequency of use and generating a first list provided to set the functions; and
   instructions for displaying a user interface for setting the functions on the screen, based on the first list.

15. The non-transitory computer-readable storage medium of claim 9, wherein the instructions for the displaying of the screen for setting the certain function supported by the first application, based on the at least one input that is input after the first input, comprise instructions for displaying, according to a second input for setting a first function of the first application, at least one of recent setting information of the first function, basic setting information of the first function, or user setting information of the first function.

16. The non-transitory computer-readable storage medium of claim 9, wherein the instructions for the executing of the application for controlling the operation of the image forming apparatus, in the electronic apparatus, comprise instructions for, when the electronic apparatus is located within a pre-set distance from the first image forming apparatus, recognizing a tag attached to the first image forming apparatus by the electronic apparatus and automatically executing the application for controlling an operation of the first image forming apparatus.

17. An image forming apparatus comprising:
   a communication device to communicate with an external device;
   a processor to control an operation of the image forming apparatus; and
   a memory storing instructions executable by the processor,
   wherein the processor executes the instructions to:
      identify an electronic apparatus for controlling the image forming apparatus externally and perform communication connection between the image forming apparatus and the electronic apparatus;
      generate an application list including at least one application installed in the image forming apparatus and transmit the application list to the electronic apparatus through the communication device;
      receive a message indicating selection of a first application based on the application list from the electronic apparatus;
      generate setting information used to set functions supported by the first application and transmit the setting information to the electronic apparatus through the communication device;
      receive a message indicating selection of a first function of the first application from the electronic apparatus through the communication device;
      generate first setting information used to set the first function in a hierarchical structure including an upper item and a sub-item; and
      transmit the first setting information to the electronic apparatus through the communication device.

18. The image forming apparatus of claim 17, wherein the processor further executes the instructions to, based on a first operation state of the image forming apparatus, acquire guide information for guiding an operation to be performed in the image forming apparatus according to the first operation state and transmit the guide information to the electronic apparatus through the communication device.

19. The image forming apparatus of claim 17, wherein the processor further executes the instructions to generate second setting information used to set a second function of a second application related to the first function of the first application and transmit the second setting information to the electronic apparatus through the communication device.

20. The image forming apparatus of claim 17, wherein the processor further executes the instructions to construct functions supported by the first application in descending order of frequency of use and generate the setting information used to set the functions.

* * * * *